United States Patent
Millsap

(10) Patent No.: US 9,549,544 B1
(45) Date of Patent: Jan. 24, 2017

(54) MOTION DETECTING AND ALERTING SYSTEM AND METHOD

(71) Applicant: John B. Millsap, Bernice, LA (US)

(72) Inventor: John B. Millsap, Bernice, LA (US)

( * ) Notice: Subject to any disclaimer, the term of this patent is extended or adjusted under 35 U.S.C. 154(b) by 76 days.

(21) Appl. No.: 14/661,047

(22) Filed: Mar. 18, 2015

(51) Int. Cl.
*A01M 31/00* (2006.01)
*G08B 13/14* (2006.01)
*G08B 21/02* (2006.01)

(52) U.S. Cl.
CPC ........ *A01M 31/002* (2013.01); *G08B 13/1436* (2013.01); *G08B 21/0225* (2013.01); *G08B 21/0247* (2013.01)

(58) Field of Classification Search
CPC ............ G08B 13/1436; G08B 21/0225; G08B 21/0247; G08B 13/1427; G08B 21/0213; G08B 13/19; G08B 21/02; G08B 21/0286; G08B 21/0288; G08B 21/025; H04W 4/023

See application file for complete search history.

(56) References Cited

U.S. PATENT DOCUMENTS

| | | | |
|---|---|---|---|
| 5,001,461 A | 3/1991 | Vroom et al. | |
| 5,450,060 A | 9/1995 | Parkhurst | |
| 5,534,847 A | 7/1996 | McGregor | |
| 5,963,131 A | 10/1999 | D'Angelo et al. | |
| 6,265,974 B1 * | 7/2001 | D'Angelo | G08B 13/1409 340/328 |
| 6,359,564 B1 * | 3/2002 | Thacker | G08B 5/00 340/330 |
| 7,042,355 B2 | 5/2006 | Hunter et al. | |
| 2005/0110639 A1 * | 5/2005 | Puzio | G08B 13/14 340/572.1 |
| 2009/0009326 A1 * | 1/2009 | Veiga, III | G08B 25/08 340/541 |
| 2014/0145847 A1 * | 5/2014 | Jenkins | G08B 13/1427 340/572.1 |

FOREIGN PATENT DOCUMENTS

FR   EP 2876619 A1 *  5/2015  ............ H04W 4/023

* cited by examiner

*Primary Examiner* — Mirza Alam
(74) *Attorney, Agent, or Firm* — R. Keith Harrison

(57) ABSTRACT

A motion detecting and alerting system includes at least two motion detectors adapted to detect motion and transmit transmission signals upon detecting motion, at least one alert module adapted to receive the transmission signals and indicate the motion and a wrist strap carried by the alert module.

16 Claims, 15 Drawing Sheets

MOTION DETECTING AND ALERTING SYSTEM AND METHOD

FIELD

The disclosure generally relates to motion detectors. More particularly, the disclosure relates to a motion detecting and alerting system and method in which motion is detected at one or multiple locations and a user at a distant location is alerted to the motion.

BACKGROUND

Hunting is a sport which has been popular among lovers of the outdoors since man has appeared on the Earth. Various approaches to hunting game such as deer have been devised in such a manner as to maximize the chances of sighting and killing the game. A common approach to hunting game involves a hunter's sitting in an elevated stand and listening and watching the woods or fields beneath the stand for signs of an approaching deer or other game animal. In the event that the hunter spots a game animal which is deemed to be within firing range, the hunter fires upon the animal in attempt to kill the animal. If the animal is struck, the hunter climbs down from the stand and walks over to the animal to ascertain whether the animal was killed by the shot. In the event that the initial shot failed to kill the animal, the hunter may fire additional shots at the animal. In either case, the killed animal is then typically transported to a camp or other area on an all-terrain vehicle (ATV) or the like and dressed and preserved for consumption.

Hunting game from an elevated stand has a number of drawbacks. It may be difficult for a hunter to quickly locate a stand and then climb up into the stand while carrying a firearm and other equipment. In cold weather climates, bulky clothing and inclement weather conditions such as rain, snow, ice and freezing temperatures may increase the dangers of climbing into a stand. It may also be difficult for a hunter to discern the signs of a game animal approaching the stand since the deer may be obscured by heavy woods or other foliage or structures.

Another drawback to using a stand to locate game is that the hunter is confined to a small area in the stand and cannot freely move about to search for game. Thus, considerable patience may be required for a hunter to wait for the game to approach the stand. Moreover, as long as he or she remains in the stand, the hunter is not able to investigate other areas for the presence of game and thereby increase his or her chances of success.

Therefore, a motion detecting and alerting system and method which is particularly suitable for hunting applications and can detect motion of a game animal at one or multiple locations and alert a mobile hunter to the motion is needed.

SUMMARY

The disclosure is generally directed to a motion detecting and alerting system. An illustrative embodiment of the system includes at least two motion detectors adapted to detect motion and transmit transmission signals upon detecting motion, at least one alert module adapted to receive the transmission signals and indicate the motion and a wrist strap carried by the alert module.

The disclosure is further generally directed to a motion detecting and alerting method. An illustrative embodiment of the method includes placing at least two motion detectors in at least two monitored areas, attaching an alert module to a wrist of a monitoring person, detecting motion in at least one of the monitored areas, transmitting an activation signal from at least one of the motion detectors to the alert module and indicating the motion on the alert module.

BRIEF DESCRIPTION OF THE DRAWINGS

The disclosure will now be made, by way of example, with reference to the accompanying drawings, in which:

FIG. 9A is a front view of a lens field adjustment plate of a lens assembly of an illustrative embodiment of the motion detecting and indicating system;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
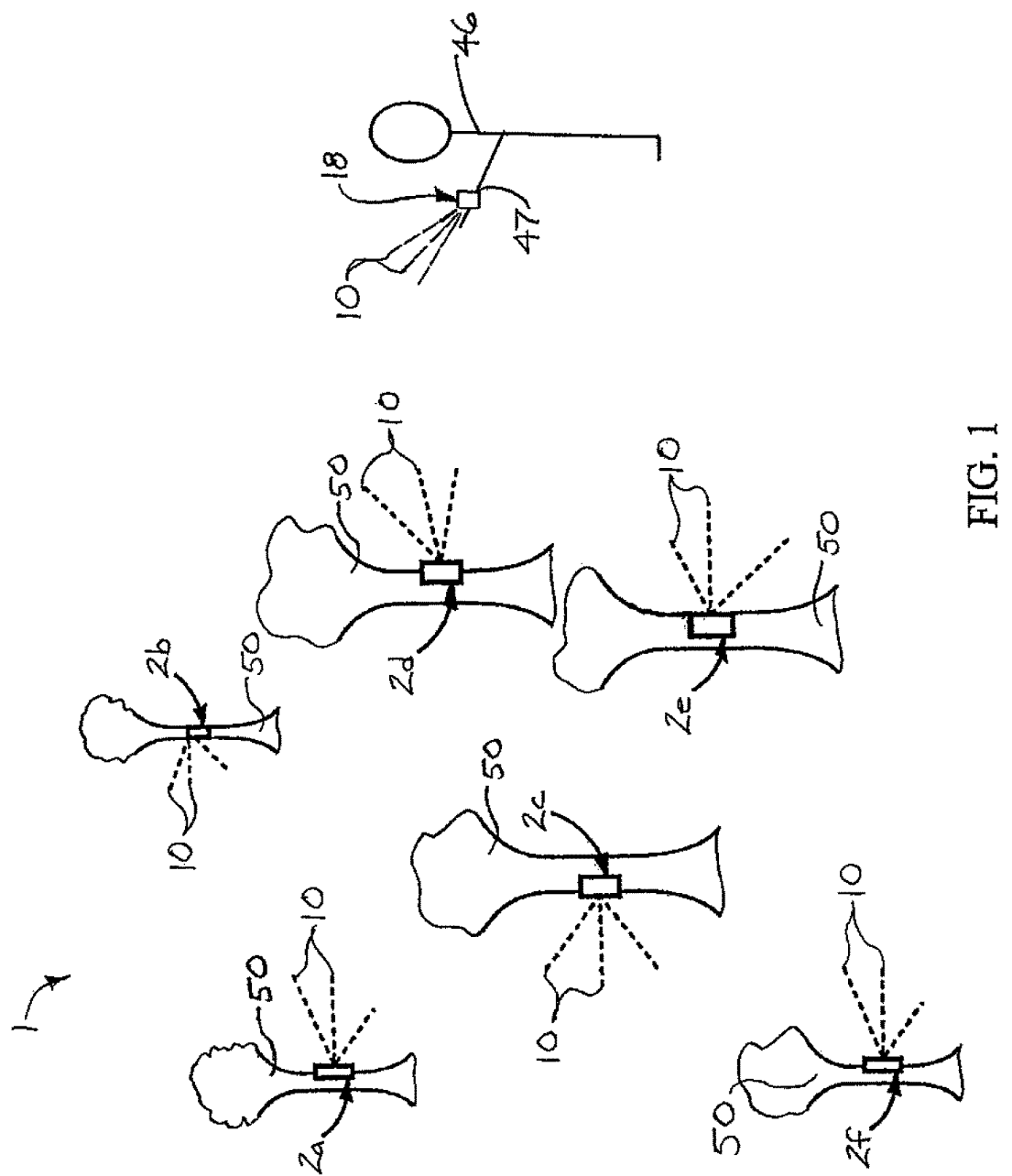
FIG. 1 is a schematic diagram which illustrates exemplary application of an illustrative embodiment of the motion detecting and alerting system.

Referring initially to FIG. 1 of the drawings, an illustrative embodiment of the motion detecting and alerting system, hereinafter system, is generally indicated by reference numeral 1. The system 1 may include at least two motion detectors 2 (multiple ones of which are indicated by reference numerals 2a-2f, respectively, in FIG. 1) and at least one alert module 18. In hunting applications, each motion detector 2 may be adapted for attachment to a support 50 such as a tree, bush or post, for example and without limitation, typically in an outdoor location. The alert module 18 may be adapted for attachment to the wrist 47 of a user 46 who may be a hunter which desires to monitor the area of each support 50 for the presence or encroachment of wild game. Each alert module 2 may be adapted to detect motion such as a game animal, for example and without limitation, as the game animal encroaches upon the area around or adjacent to the support 50 to which that alert module 2 is attached. Each alert module 2 may be further adapted to emit transmission signals 10 which are received by the alert module 18 in the event that the motion detector 2 detects motion in the area of the corresponding support 50. The alert module 18 may be adapted to alert the user 46 to the motion and indicate to the user 46 that motion has been detected by the motion detector 2 in the area of the support 50 to which that motion detector 2 is attached. Accordingly, the user 46 may approach the area of the support 50 at which motion was detected to determine the presence of game in the area for hunting or observation purposes.

Figure 3:
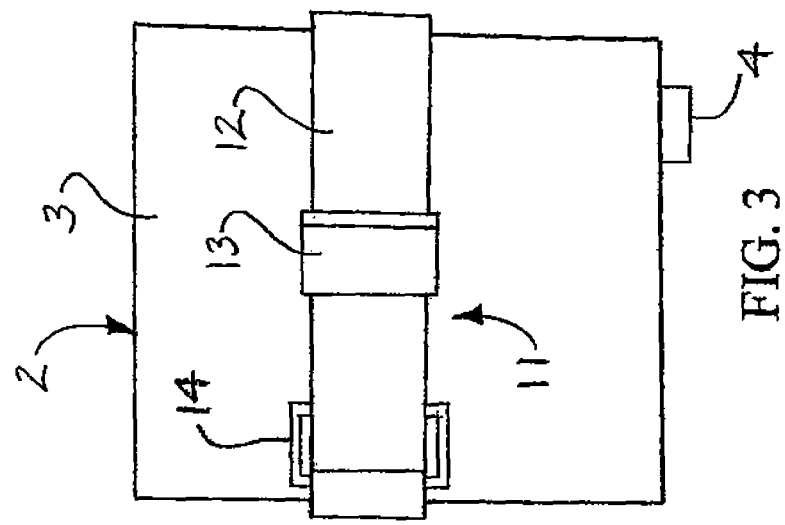
FIG. 3 is a top view of an exemplary motion detector which is suitable for implementation of an illustrative embodiment of the motion detecting and alerting system.
Figure 2:
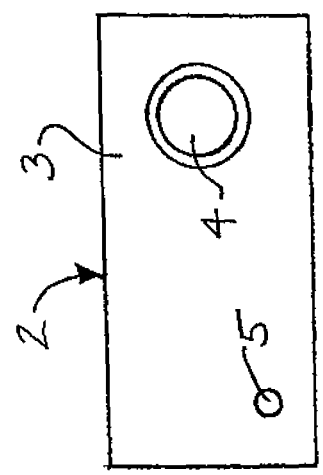
FIG. 2 is a front view of an exemplary motion detector which is suitable for implementation of an illustrative embodiment of the motion detecting and alerting system.
Figure 4:
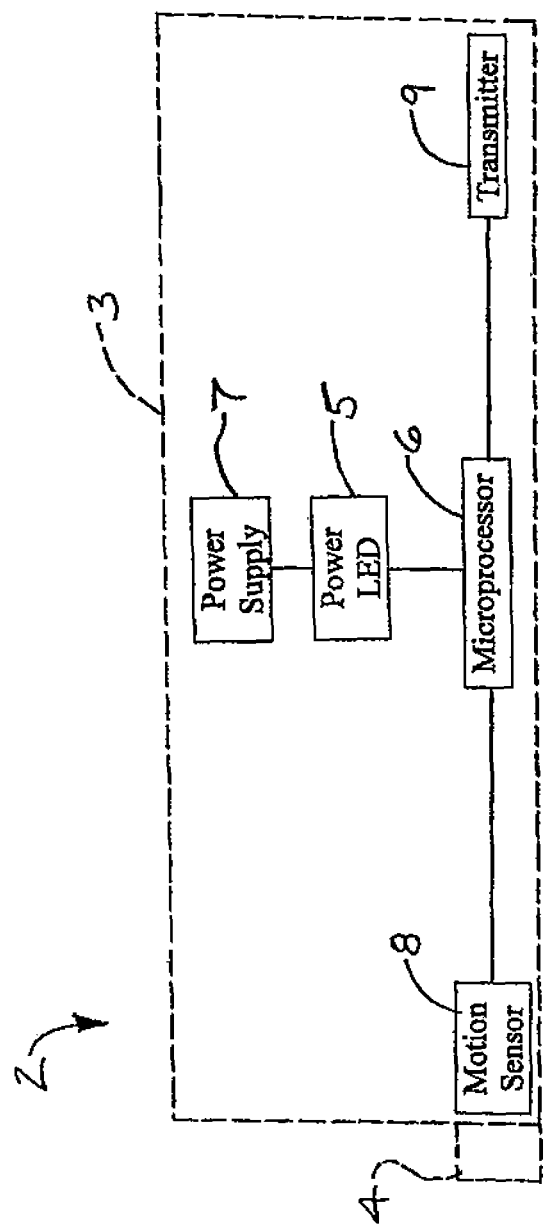
FIG. 4 is a functional block diagram of an exemplary motion detector which is suitable for implementation of an illustrative embodiment of the motion detecting and alerting system.

Referring next to FIGS. 2-4 of the drawings, each motion detector 2 of the system 1 may include a motion detector housing 3 which contains the functional components of the motion detector 2 which will be hereinafter described. The motion detector housing 3 may have a motion detector lens 4. As illustrated in FIG. 3, a motion detector attachment mechanism 11 may be provided on the motion detector housing 3 to facilitate attachment of the motion detector 2 to a support 50 (FIG. 1). In some embodiments, the motion detector attachment mechanism 11 may include an attachment strap 12. A quick connector buckle 13 and a strap adjuster 14 may be provided on the motion detector attachment strap 12 for fastening and tightening purposes, respectively. In other embodiments, the motion detector attachment mechanism 11 may include any suitable alternative technique for attaching the motion detector 2 to the support 50.

As illustrated in FIG. 4, the motion detector 2 may further include a motion detector microprocessor 6 and/or other discrete components. A power supply 7 may be electrically connected to the motion detector microprocessor 6. In some embodiments, the power supply 7 may include at least one battery. At least one power LED 5 may be electrically connected to the power supply 7. As illustrated in FIG. 2, the power LED 5 may be provided in any suitable location on the exterior surface of the motion detector 2. The power LED 5 may be adapted to indicate the power status of the power supply 7 in the conventional manner.

As further illustrated in FIG. 4, a motion sensor 8 may interface with the motion detector microprocessor 6. The motion sensor 8 may be disposed in aligned or registering relationship to the motion detector lens 4 of the motion detector 2. Through the motion detector lens 4, the motion sensor 8 may be adapted to sense motion in the general area of the support 50 (FIG. 1) to which the motion detector 2 is attached. A signal transmitter 9 may interface with the motion detector microprocessor 6. Accordingly, in the event that the motion sensor 8 senses motion through the motion detector lens 4, the motion detector microprocessor 6 is adapted to cause the signal transmitter 9 to emit RF (radio frequency) transmission signals 10 (FIG. 1) having a selected radio frequency. The signal transmitters 9 of the various respective motion detectors 2 in the system 1 may have different frequencies enabling the alert module 18 to discriminate among the frequencies and determine which of the various motion detectors 2 emitted the transmission signal 10, as will be hereinafter described.

Figure 5:
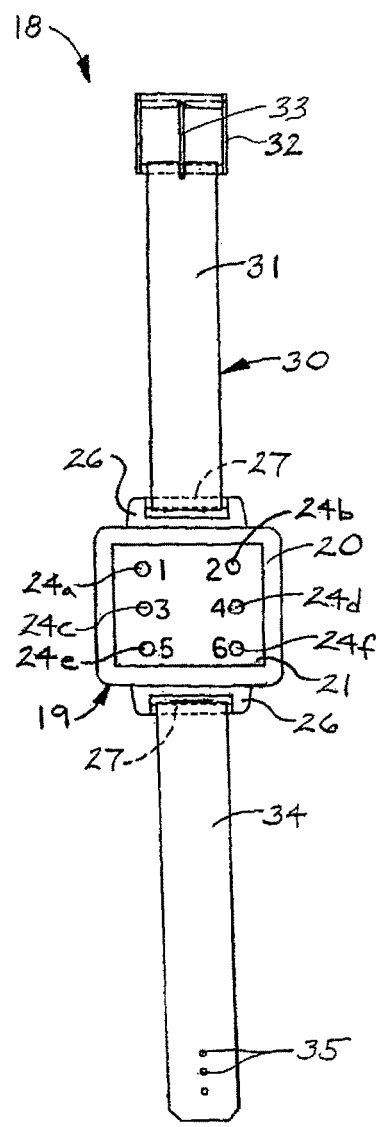
FIG. 5 is a top view of an exemplary alert module which is suitable for implementation of an illustrative embodiment of the motion detecting and alerting system.
Figure 6:
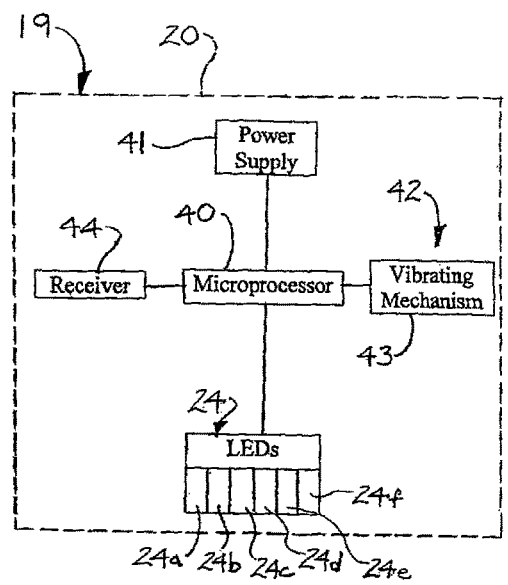
FIG. 6 is a functional block diagram of an exemplary alert module which is suitable for implementation of an illustrative embodiment of the motion detecting and alerting system.

Referring next to FIGS. 5 and 6 of the drawings, the alert module 18 of the system 1 may include an module console 19 having a module console housing 20 which contains the functional components of the motion indictor 18 which will be hereinafter described. The module console housing 19 may have an indicator panel 21. The module console 19 may be fitted with a wrist strap 30. The wrist strap 30 may include a buckle strap segment 31. A buckle 32 having a buckle pin 33 may be provided on the buckle strap 31. An insertion strap segment 34 of the wrist strap 30 may include multiple buckle pin openings 35. The buckle strap segment 31 and the insertion strap segment 34 of the wrist strap 30 may extend from a corresponding pin holder 26 and strap pin 27 on the module console 19. Accordingly, the wrist strap 30 can be fastened to the wrist 47 (FIG. 1) of the user 46 by inserting the insertion strap segment 34 into the buckle 32 and extending the buckle pin 33 of the buckle 32 into one of the buckle pin openings 35 of the insertion strap segment 34.

As illustrated in FIG. 6, the module console 19 of the alert module 18 may further include an alert module microprocessor 40 and/or other discrete components. A power supply 41 may be electrically connected to the alert module microprocessor 40. In some embodiments, the power supply 41 may include at least one battery. An alerting mechanism 42 may interface with the alert module microprocessor 40. In some embodiments, the alerting mechanism 42 may include a vibrating mechanism 43. The vibrating mechanism 43 may be the same or similar to that which is used in conventional cell phone technology to vibrate a cellular telephone upon receipt of a phone call in "vibrate" mode. In other embodiments, the alerting mechanism 42 may include an audible alarm or any other mechanism which is suitable for alerting the user 46 to the motion detected by one of the motion detectors 2.

At least one indicator LED 24 may interface with the alert module microprocessor 40. In some embodiments, multiple indicator LEDs 24 (reference numerals 24a-24f, respectively, in FIG. 6) may interface with the alert module microprocessor 40. The number of indicator LEDs 24 may correspond to the number of motion detectors 2 (FIG. 1) in the system 1. The indicator LED or LEDs 24 may be provided on the indicator panel 21 (FIG. 5) of the module console housing 20. A signal receiver 44 may interface with the alert module microprocessor 40. Accordingly, in the event that the signal receiver 44 receives a transmission signal 10 which is emitted by the signal transmitter 9 (FIG. 4) of one of the motion detectors 2, the alert module microprocessor 40 may activate the vibrating mechanism 43, which vibrates the module console 19. The alert module microprocessor 40 may further illuminate the indicator LED 24, which indicates that the motion detector 2 has detected motion in the area of the support 50 (FIG. 1) to which the motion detector 2 has been attached. In applications in which the system 1 includes multiple motion detectors 2a-2f (FIG. 1), the alert module microprocessor 40 matches the frequency of the transmission signal 10 that was emitted by a particular motion detector 2a-2f with an LED 24a-24f which corresponds to that motion detector 2a-2f that emitted the transmission signal 10.

In exemplary application of the system 1, at least two motion detectors 2 are attached to separate supports 50 (FIG. 1) each of which may be a tree, bush or post, for example and without limitation, typically in an outdoor location. Each support 50 may be located adjacent to a trail (not illustrated) or a pipeline (not illustrated) or the like, or may be placed in some other location or area along which game is likely to travel or approach. In some applications, a game feeder (not illustrated) may be placed in the area of one or more of the supports 50 to dispense game feed for the purpose of attracting game to the area of the support or supports 50. In the example illustrated in FIG. 1, 6 motion detectors 2a-2f are attached to six supports 50, respectively. However, it will be recognized and understood that in other applications, as few as two or more than 6 motion detectors 2 may be attached to a corresponding number of supports 50. Each motion detector 2 may be attached to the corresponding support 50 by fastening the attachment strap 12 (FIG. 3) of the motion detector attachment mechanism 11 around the support 50 using the quick connector buckle 13 and tightening the attachment strap 12 using the strap adjuster 14.

In hunting applications, the alert module 18 of the system 1 is attached to the wrist 47 of a user 46 such as a hunter who desires to monitor the area of each support 50 for the presence or encroachment of wild game. Accordingly, the wrist strap 30 (FIG. 5) of the alert module 18 is fastened around the wrist 47 (FIG. 3) of the user 46 typically by extending the insertion strap segment 34 through the buckle 32 on the buckle strap segment 31 and extending the buckle pin 33 of the buckle 32 through one of the buckle pin openings 35 in the insertion strap segment 34.

As each motion detector 2 monitors the area around the corresponding support 50 to which the motion detector 2 is attached for motion, the user 46 may travel freely by walking or by riding a vehicle (not illustrated). The user 46 may travel beyond the sight of the supports 50 to which the motion detectors 2 are attached in an effort to locate game. In the event that one of the motion detectors 2 detects motion within the field of the motion detector 2, the signal transmitter 9 (FIG. 4) of the motion detector 2 transmits a transmission signal 10 which is received by the signal receiver 44 (FIG. 6) of the alert module 18. In response, the alert module microprocessor 40 activates the vibrating mechanism 43, which vibrates the module console 19 of the alert module 18. The vibration of the module console 19 alerts the user 46 that one of the motion detectors 2 has detected motion. The alert module microprocessor 40 additionally illuminates the indicator LED 24a-24f which corresponds to the motion detector 2a-2f that detected the motion. As an example, in the event that the motion detector 2c detects motion, the alert module microprocessor 40 illuminates the indicator LED 24c on the indicator panel 21 of the module console 19. The user 46 views the indicator panel 21 of the module console 19 and sees that the indicator LED 24c is illuminated and can approach the area of the support 50 to which the motion detector 2c is attached to investigate the cause of the motion. In the event that the motion was caused by game encroaching upon the area of the support 50, the user 46 can take aim and attempt to shoot the game. In the event that more than one of the indicator lights 24a-24f on the indicator panel 21 is illuminated, the user 46 can investigate the areas of the corresponding supports 50 to which the respective motion detectors 2 are attached in whichever order is desired or deemed necessary to determine the cause of the motion which is detected in each area. After a period of use, the power LED 5 (FIGS. 2 and 4) may indicate the power level of the power supply 7 (FIG. 4) typically in the conventional manner for replacement or recharging purposes.

It will be appreciated by those skilled in the art that the wrist strap 30 (FIG. 5) facilitates attachment of the alert module 18 to the wrist 47 of the user 46 and enables the user 46 to remain mobile while the motion detector or detectors 2 monitor the corresponding area or areas of the supports 50 to which the motion detectors 2 are attached. Accordingly, the user 46 can travel to areas which are beyond sight of the motion detectors 2 but within range of the alert module 18 in an effort to locate game, and therefore is not confined to the general area of the motion detectors 2. This expedient enables the user 46 to monitor a much larger area for game than could be achieved if the user 46 were confined to a stand. It will be further appreciated by those skilled in the art that the system 1 is applicable to a variety of uses including but not limited to hunting applications. For example and without limitation, the system 1 may be used in a warehouse or retail establishment to deter theft.

Figure 7:
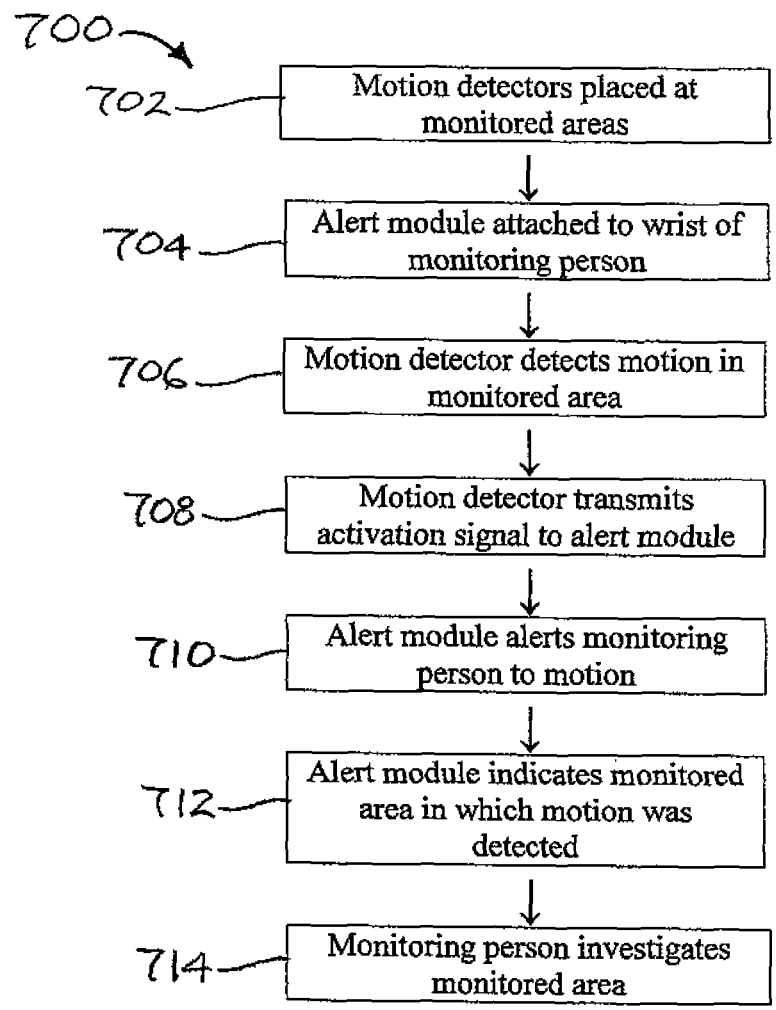
FIG. 7 is a flow diagram of an illustrative embodiment of the motion detecting and alerting method.

Referring next to FIG. 7 of the drawings, an illustrative embodiment of the motion detecting and indicating method is generally indicated by reference numeral 700. In block 702, at least two motion detectors are placed in at least two monitored areas, respectively. In hunting applications, each monitored area may be a deer trail, pipeline or other area along which game may be likely to travel or which game may be likely to approach. In some applications, multiple motion detectors may be placed at multiple monitored areas. The motion detectors may be attached to a tree, bush, post or other suitable support at the monitored area.

In block 704, an alert module is attached to a wrist of a monitoring person. In block 706, at least one of the motion detectors detects motion in at least one monitored area. In block 708, the motion detector transmits an activation signal to the alert module. In block 710, the alert module alerts the monitoring person to the motion which was detected by the motion detector. In some embodiments, the alert module vibrates to alert the monitoring person to the detected motion. In other embodiments, the alert module may emit an audible alarm and/or perform some other alerting function. In still other embodiments, the alert module may include a cell phone which has vibration mode capability and is carried by the monitoring person. In block 712, the alert module indicates the monitored area in which the motion was detected. In some embodiments, an indicator LED on the alert module is illuminated. In block 714, the monitoring person investigates the monitored area.

Figure 8:
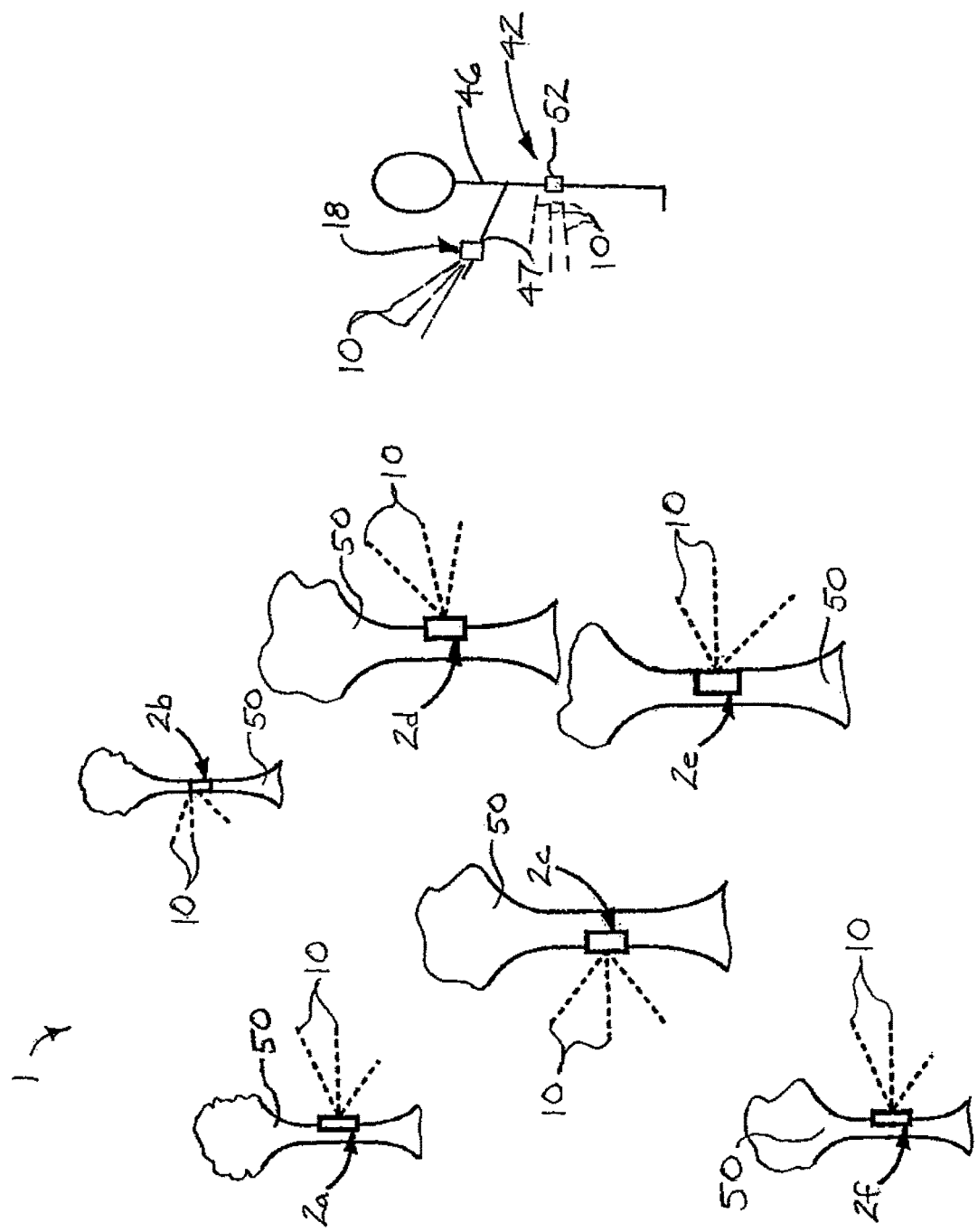
FIG. 8 is a schematic diagram which illustrates exemplary application of an alternative illustrative embodiment of the motion detecting and alerting system.
Figure 10:
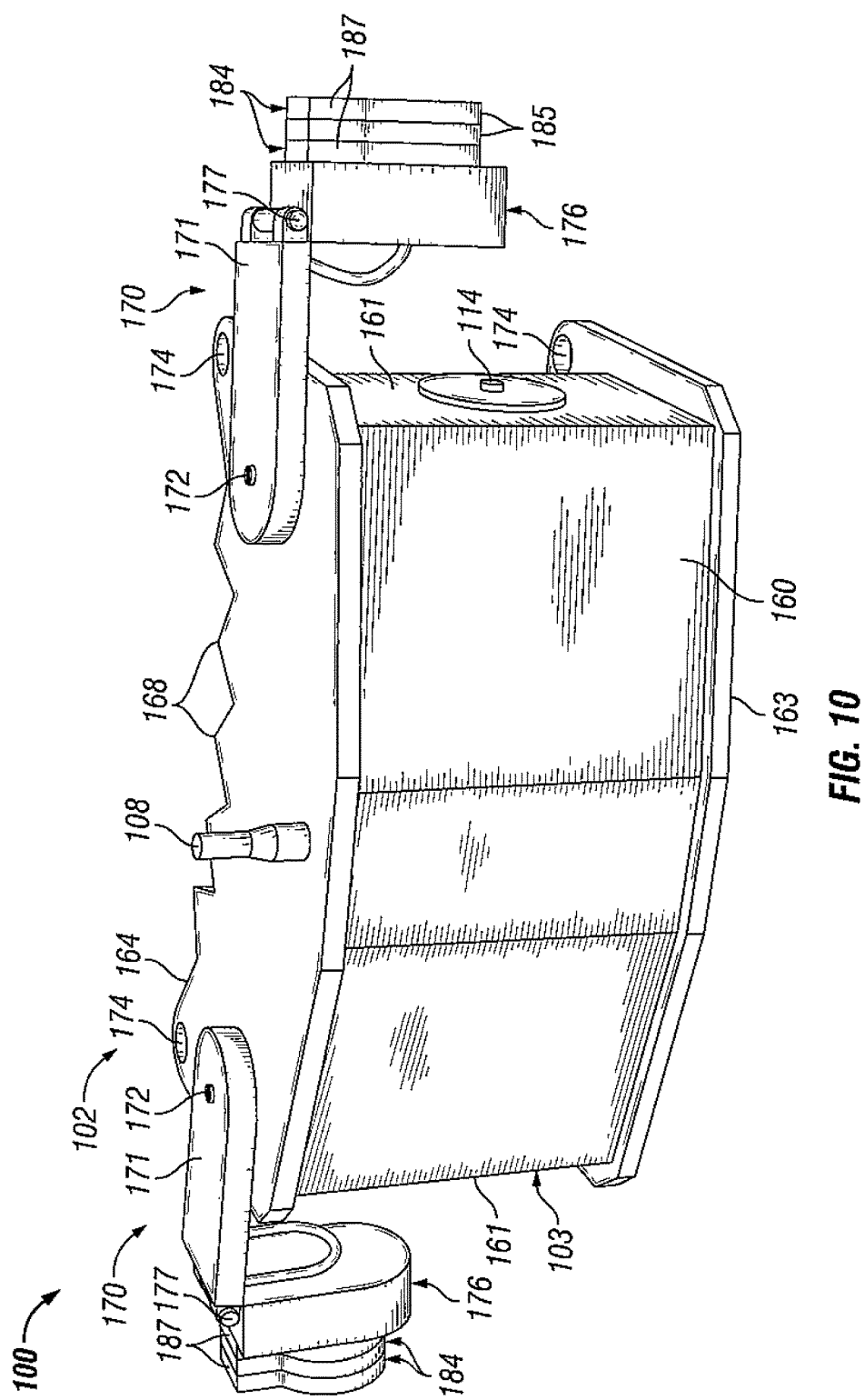
FIG. 10 is a front perspective view of the motion detector illustrated in FIG. 9, more particularly illustrating an alternative position of a pair of lens assemblies relative to the position illustrated in FIG. 9.
Figure 11:
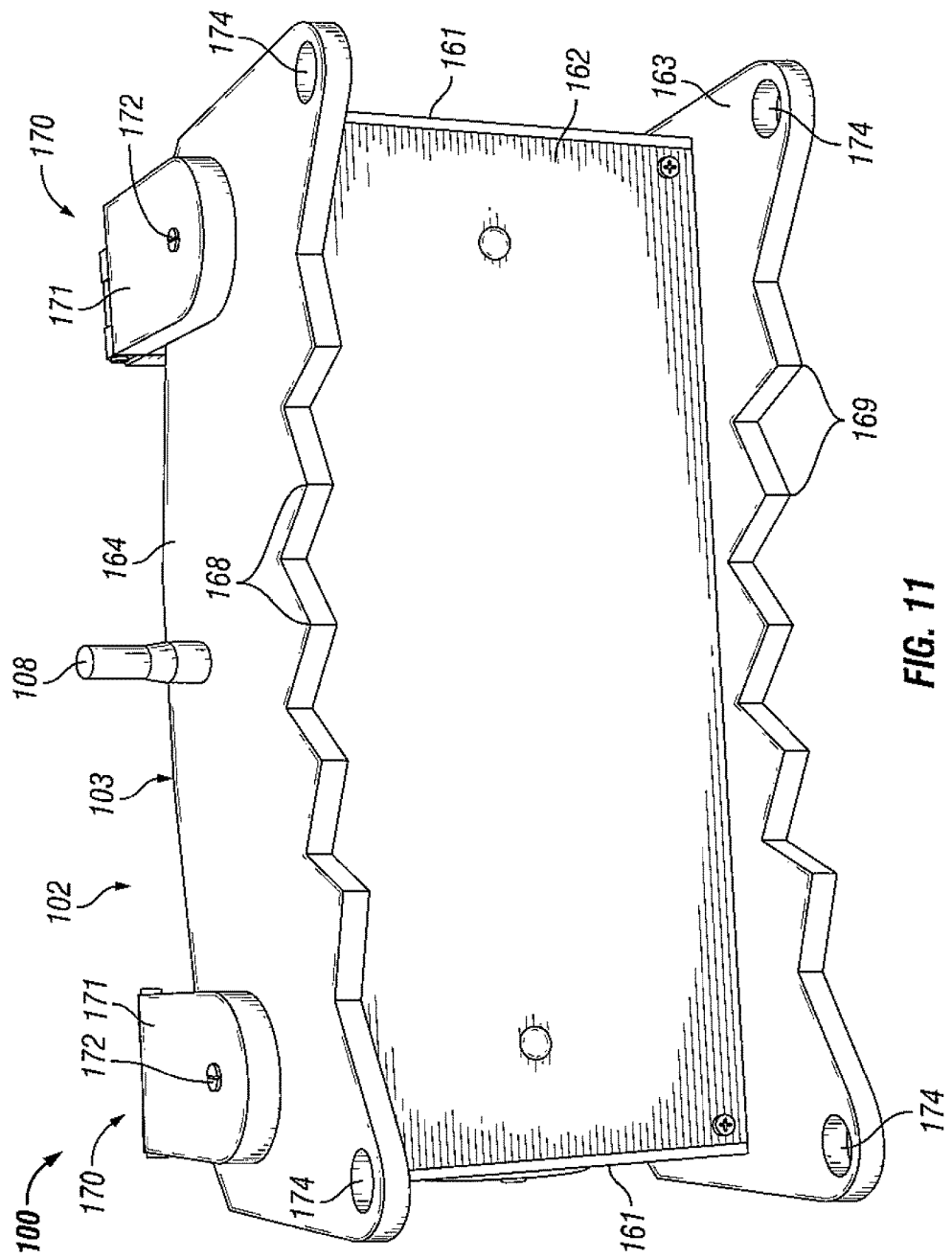
FIG. 11 is a rear perspective view of the motion detector illustrated in FIG. 9.

Referring next to FIG. 8 of the drawings, in some embodiments of the system 1, the alerting mechanism 42 (FIG. 6)

may include a cell phone 52 which may have conventional vibratory alert capability and is carried by the user 46. Accordingly, as illustrated in FIG. 10, in the event that one of the motion detectors 2 detects motion, the transmitter 9 (FIG. 4) transmits transmission signals 10 to both the receiver 44 (FIG. 6) of the alert module 18 and the cell phone 52. The microprocessor 40 (FIG. 6) of the alert module 18 energizes the LED 24 which corresponds to the motion detector 2 that detected the motion, as was heretofore described. Simultaneously, the cell phone 52 vibrates, alerting the user 46 that motion was detected by one of the motion detectors 2. The user 46 views the module panel 21 on the module console 19 of the alert module 18 to determine which of the LEDs 24 is illuminated for the purpose of investigating the source of the motion at the corresponding motion detector 2, as was heretofore described.

Figure 12:
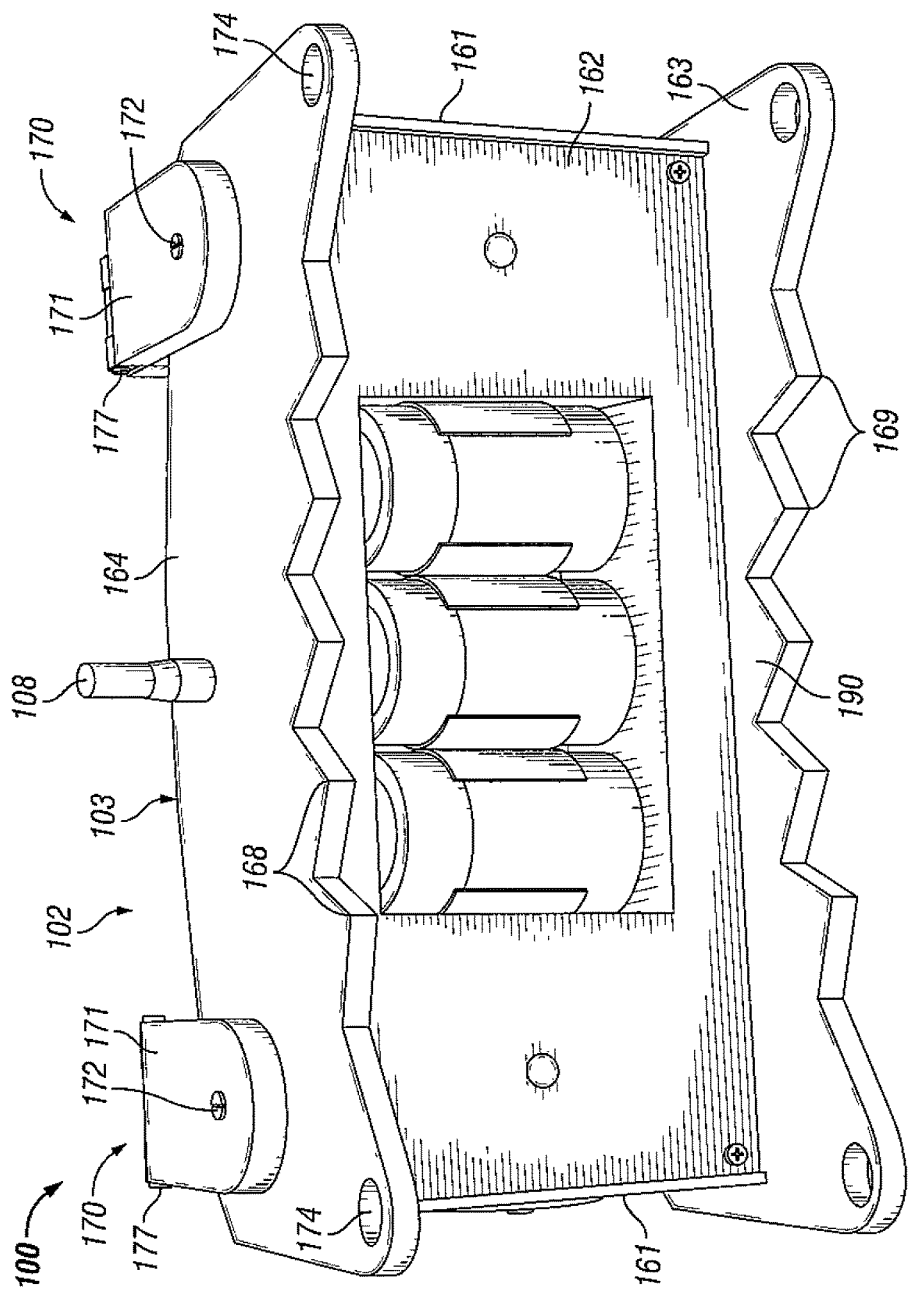
FIG. 12 is a rear perspective view of the motion detector, more particularly illustrating a battery compartment in the motion detector.
Figure 13:
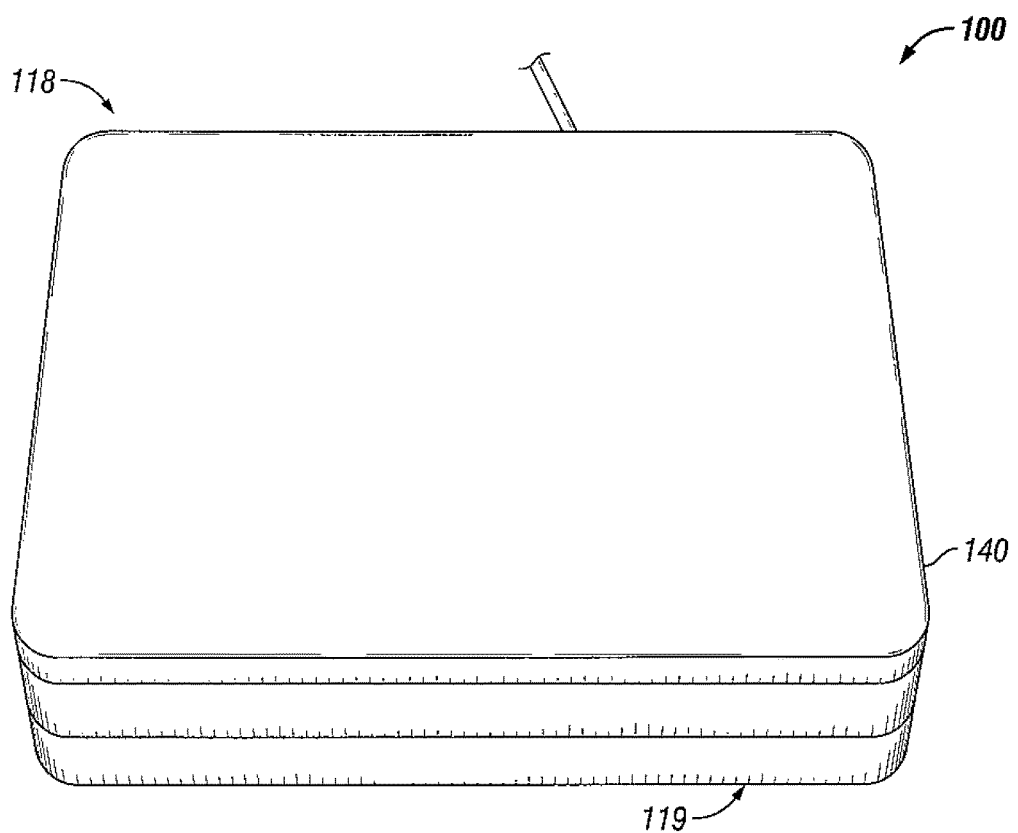
FIG. 13 is a perspective view of an alert module of the alternative illustrative embodiment of the motion detecting and indicating system.
Figure 15:
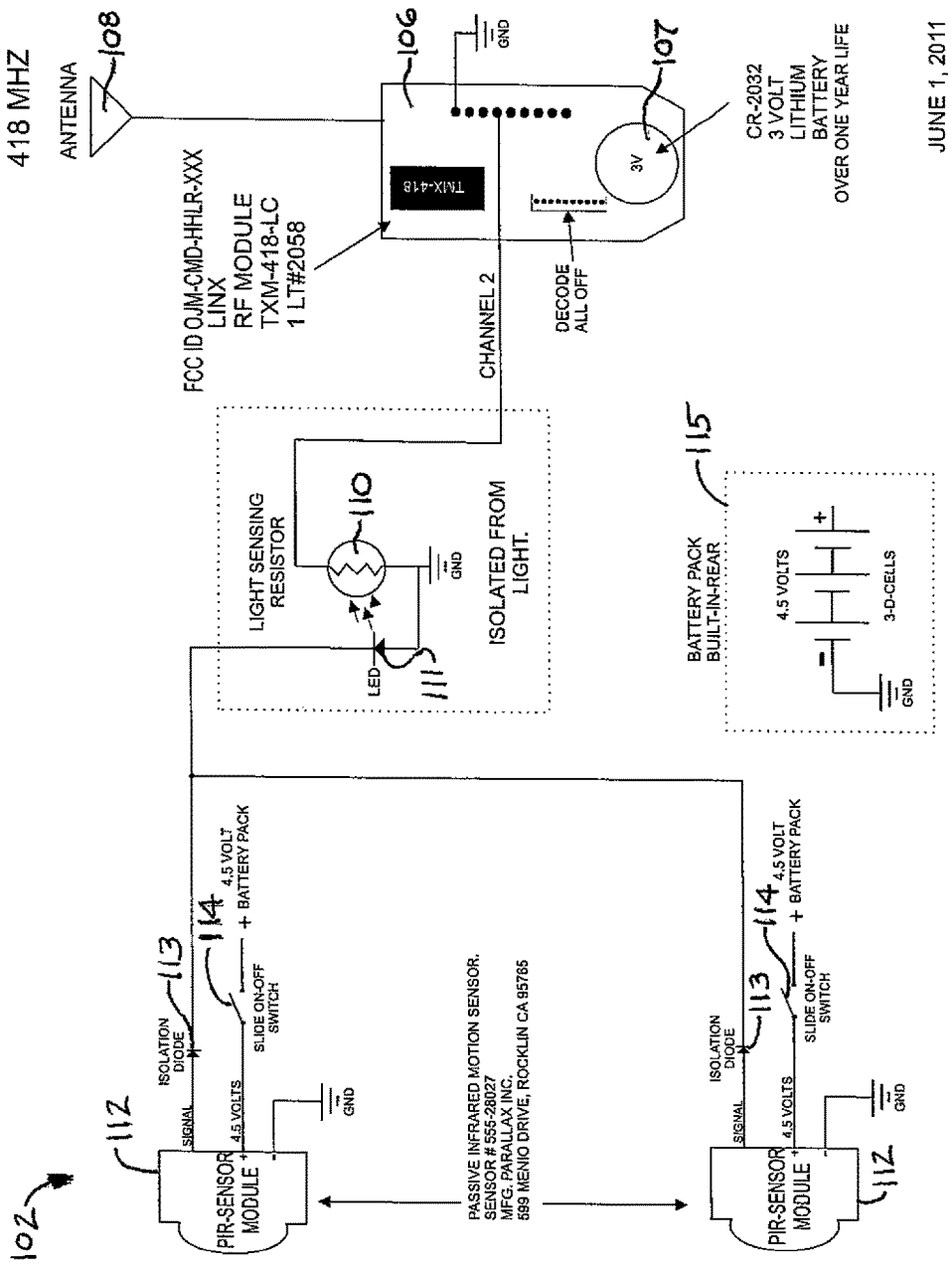
FIG. 15 is a schematic wiring diagram which illustrates functional components of the motion detector illustrated in FIG. 9.
Figure 16:
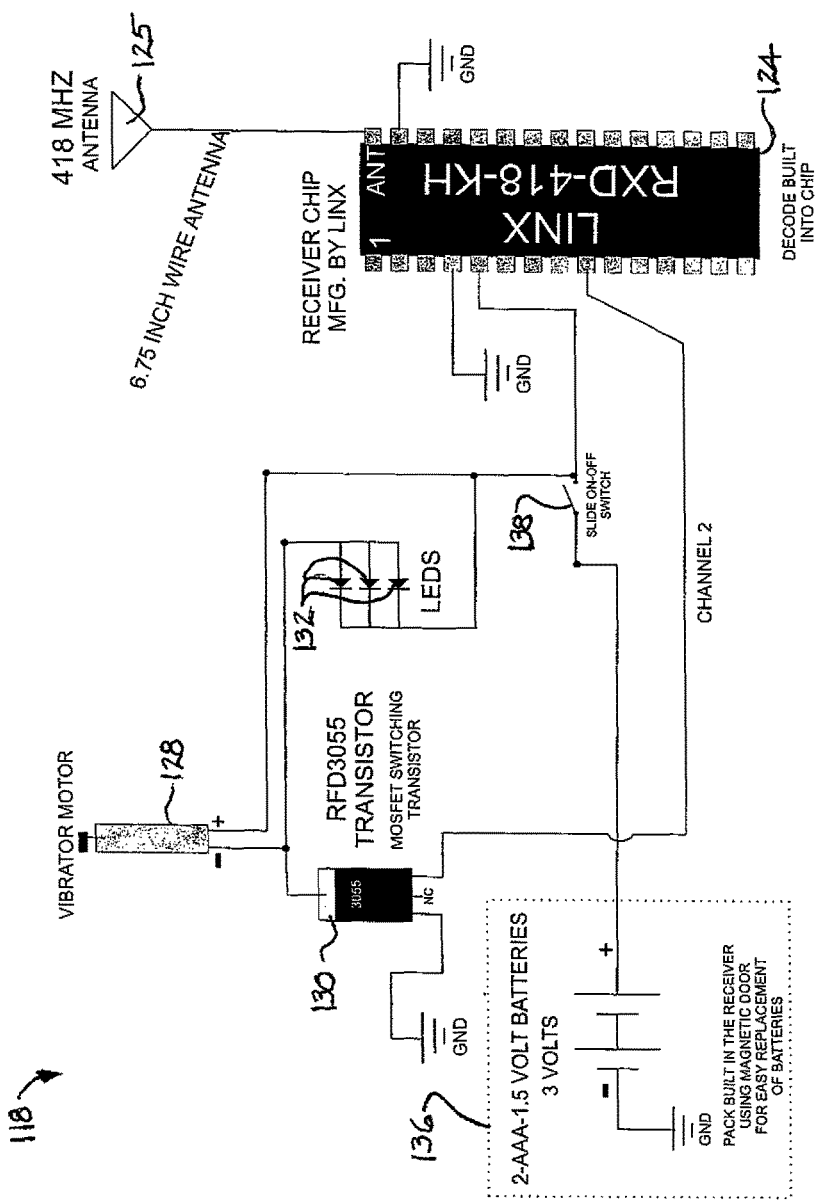
FIG. 16 is a schematic wiring diagram which illustrates functional components of the alert module illustrated in FIG. 13.
Figure 17:
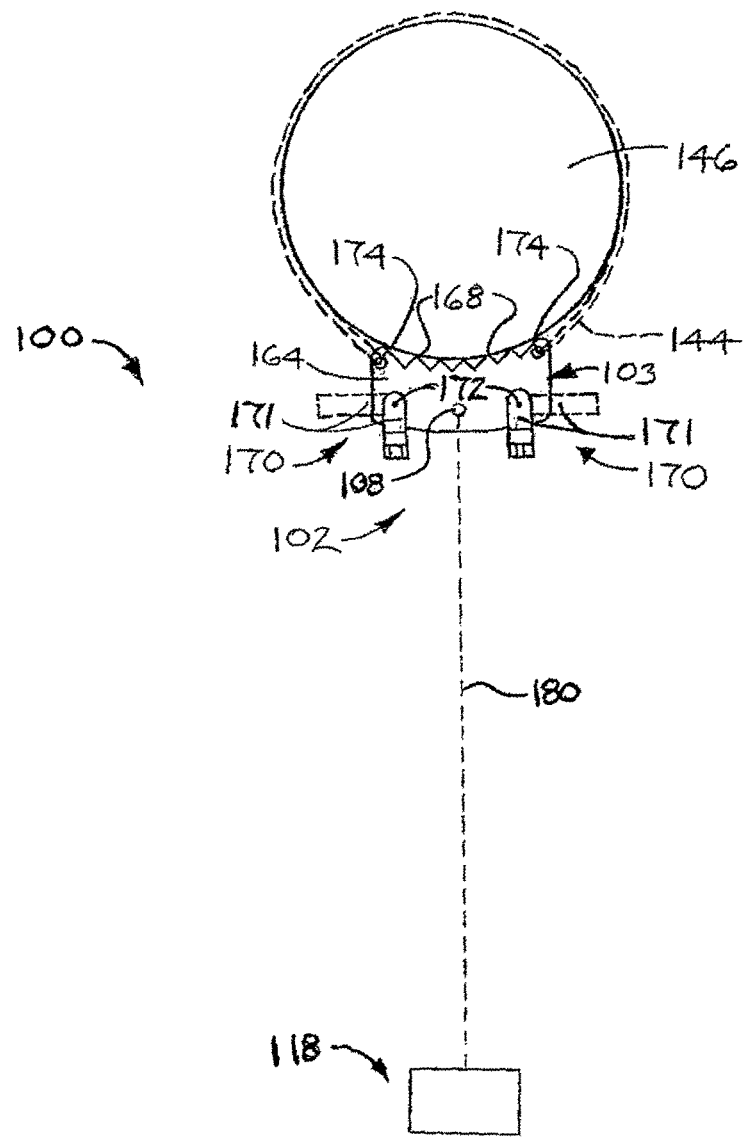
FIG. 17 is a diagram which illustrates the motion detector and the alert module of the illustrative embodiment of the motion detecting and indicating system illustrated in FIGS. 9-16.

Referring next to FIGS. 9-17 of the drawings, an alternative illustrative embodiment of the motion detecting and indicating system, hereinafter system, is generally indicated by reference numeral 100 in FIG. 17. The system 100 may include a motion detector 102 having a motion detector housing 103 which is adapted to contain functional components of the motion detector 102 which will be hereinafter described. In exemplary application of the system 100, which will be hereinafter described, the motion detector 102 may be adapted for attachment to a tree 146 or other support. In some embodiments, the motion detector housing 103 may be generally elongated and rectangular, as illustrated in FIGS. 9-12. The motion detector housing 103 may include a front housing panel 160, a pair of spaced-apart side housing panels 161, a rear housing panel 162, a bottom housing panel 163 and a top housing panel 164. In some embodiments, multiple serrated housing teeth 168 may be provided in a rear edge of the top housing panel 164. Multiple serrated housing teeth 169 (FIG. 11) may additionally or alternatively be provided in a rear edge of the bottom housing panel 163 for purposes which will be hereinafter described. As illustrated in FIG. 12, a battery compartment 190 may be provided in the motion detector housing 103. The battery compartment 190 may be accessed through the rear housing panel 162, as illustrated, or through any other portion of the motion detector housing 103. In some embodiments, a battery compartment door (not illustrated) may be magnetically attached to the motion detector housing 103.

Figure 9:
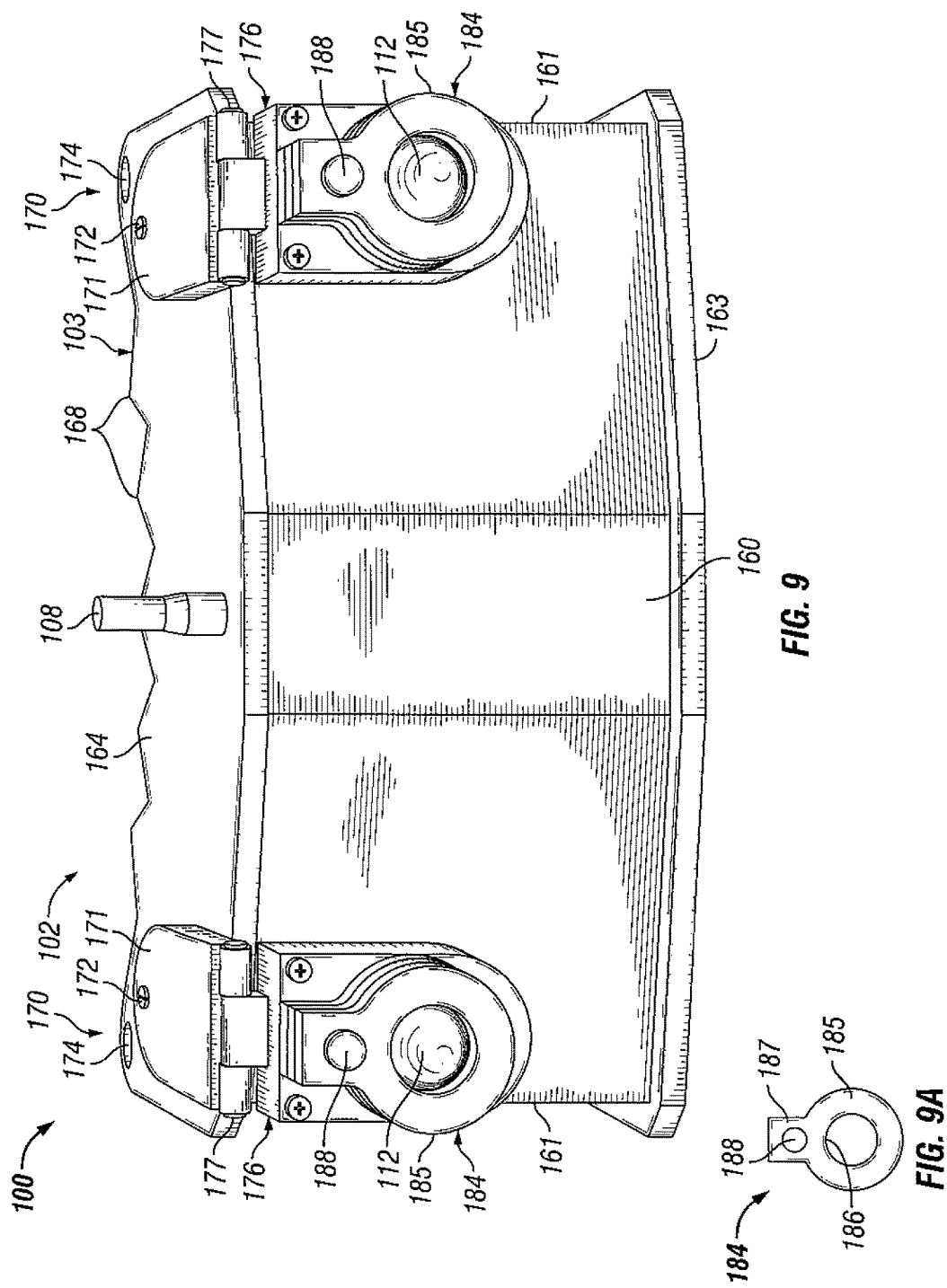
FIG. 9 is a front perspective view of a motion detector of an illustrative embodiment of a motion detecting and indicating system.

At least one lens assembly 170 may be provided on the motion detector housing 103. In some embodiments, a pair of lens assemblies 170 may be provided at opposite ends of the motion detector housing 103, as illustrated. Each lens assembly 170 may include an articulated assembly mount arm 171 which may be pivotally attached to the motion detector housing 103 via a pivot pin 172. A lens housing 176 may be supported by the assembly mount arm 171. In some embodiments, the lens housing 176 may be pivotally attached to the assembly mount arm 171 via a lens housing hinge 177. As illustrated in FIG. 9, the lens housing 176 of each lens assembly 170 may contain a sensor module 112 which will be hereinafter described. The sensor module 112 may be exposed through a sensor module opening (not numbered) in the lens housing 176.

At least one lens field adjustment plate 184 may be detachably attached to the lens housing 176 of each lens assembly 170. As illustrated in FIG. 9A, each lens field adjustment plate 184 may include a circular plate rim 185 and a plate opening 186 extending through the plate rim 185. A plate tab 187 may extend from the plate rim 185. A plate magnet 188 may be provided on the plate tab 187. The lens field adjustment plate 184 may be attached to the lens housing 176 with the plate opening 186 of the lens field adjustment plate 184 aligned with the sensor module opening (not numbered) of the lens housing 176. In some embodiments, multiple lens field adjustment plates 184 may be attached to each other with the plate openings 186 of the respective lens field adjustment plates 184 disposed in alignment with each other and with the sensor module 112 exposed through the sensor module opening (not illustrated) in the lens housing 176 and the plate openings 186 of the respective lens field adjustment plates 184, as illustrated in FIG. 9.

In some embodiments, each lens field adjustment plate 184 may be magnetically attached to the corresponding lens housing 176. Accordingly, a plate magnet 188 may be provided on the plate tab 187 or other portion of the lens field adjustment plate 184. The lens housing 176 may be a magnetic material or alternatively, a housing magnet (not illustrated) may be provided on the lens housing 176. Thus, the plate magnet 188 can be selectively and magnetically attached to the lens housing 176 via the plate magnet 188. In some applications of the system 101, multiple lens field adjustment plates 184 can be magnetically and successively attached to the lens housing 176 and to each other in a stacked configuration to partially obscure or restrict the peripheral field of view of the sensor module 112 and impart a tunnel vision effect to the field of view of the sensor module 112 as may be desired in some applications of the system 101. Restriction of the peripheral field of view of the sensor module 112 progressively increases with the number of lens field adjustment plates 184 which are attached to the lens housing 176 and stacked on each other. Conversely, the lens field attachment plates 184 can be successively removed from the lens housing 176 to widen or enlarge the peripheral field of view of the sensor module 112 as may be desired in some applications of the system 101. The lens field attachment plates 184 can be omitted from the lens housing 176 to maximize the peripheral field of view of the sensor module 112.

A schematic wiring diagram which illustrates exemplary functional components of the motion detector 102 illustrated in FIG. 15. The motion detector 102 may include a motion detector transmitter module 106 powered by at least one module battery 107. A module antenna 108 may interface with the motion detector transmitter module 106. A light-sensing resistor 110 may interface with the motion detector transmitter module 106. An LED 111 may interface with the light-sensing resistor 110.

At least one sensor module 112 may interface with the light sensing resistor 110. In some embodiments, a pair of sensor modules 112 may interface with the light sensing resistor 110, as illustrated. Each sensor module 112 may be contained in the lens housing 176 of the corresponding lens assembly 170 (FIG. 9). An isolation diode 113 may be provided between each sensor module 112 and the light sensing resistor 110. A motion detector battery pack 115 may electrically interface with each sensor module 112. In some embodiments, each motion detector battery pack 115 may be a 4.5-volt battery pack. The motion detector battery pack 115 may be sized and configured to be contained in the battery compartment 190 (FIG. 12) in the motion detector housing 103. In some embodiments, a power switch 114 may be provided between the motion detector battery pack 115 and each sensor module 112 to selectively establish flow of electrical current from the motion detector battery pack 115 to the sensor module 112. Each power switch 114 may be provided in any suitable location on the exterior surface of the motion detector housing 103. In some embodiments, the motion detector 102 may include a flash chip (not illustrated) which enables activation of the motion detector 102 responsive to animal sounds such as a squirrel or a hoot owl, for example and without limitation, instead of or in addition to motion.

In application of the system 100, which will be hereinafter described, the light sensing resistor 110 is adapted to sense motion by sensing changes in the light which reaches each sensor module 112. In response, the light sensing resistor 110 activates the motion detector transmitter module 106, which transmits an RF (radio frequency) transmission signal 180 (FIG. 17) to the alert module 118. The alert module 118 alerts a user (not illustrated) to the motion which was detected by the motion detector 102.

Figure 14:
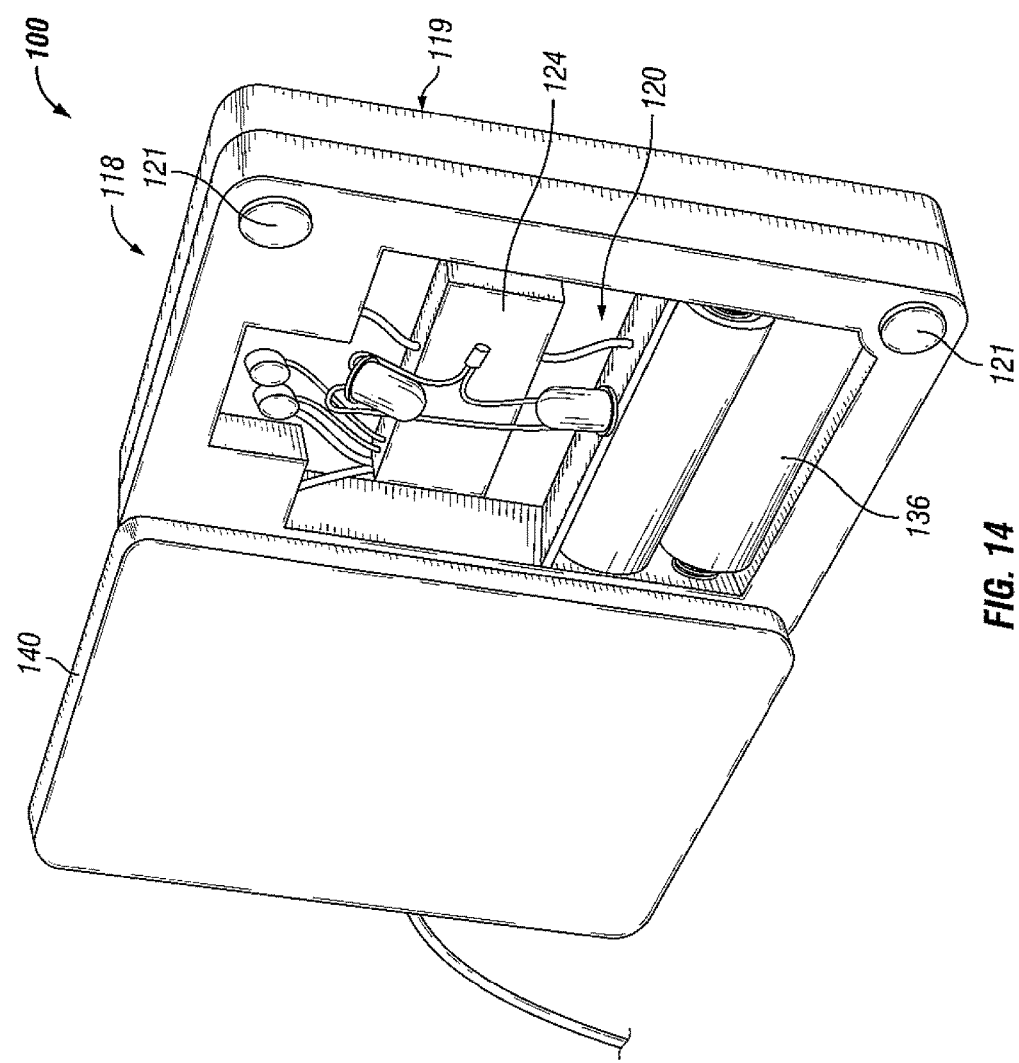
FIG. 14 is a perspective view of the alert module illustrated in FIG. 13, with the alert module illustrated in a partially-open position.

As illustrated in FIG. 17, the system 100 may further include an alert module 118. As illustrated in FIG. 14, the alert module 118 may include an alert module base 119 having a base interior 120. The base interior 120 may be sized and configured to contain functional components of the system 100 which will be hereinafter described. An alert module cover 140 may be detachably attached to the alert module base 119. In some embodiments, the alert module cover 140 may be magnetically attached to the alert module base 119. Accordingly, base magnets 121 may be provided at respective corners of the alert module base 119. Cover magnets (not illustrated) may be provided at respective corners of the alert module cover 140 to magnetically engage the respective base magnets 121. In some embodiments, the alert module base 119 or the alert module cover 140 of the alert module 118 may be fitted with a clip (not illustrated), a belt loop (not illustrated) or other attachment mechanism to facilitate attachment of the alert module 118 to the belt or other article of clothing of a user.

A schematic wiring diagram which illustrates exemplary functional components of the alert module 118 is illustrated in FIG. 16. The alert module 118 may include a receiver chip 124. A receiver antenna 125 may interface with the receiver chip 124. A vibrator motor 128 may interface with the receiver chip 124. A transistor 130 may interface with the vibrator motor 128 and with the receiver chip 124 through at least one LED 132. An alert module battery pack 136 may be electrically connected to the receiver chip 124. The alert module battery pack 136 may be sized and configured to fit in the base interior 120 (FIG. 14) of the alert module base 119. A power switch 138 may be provided between the receiver chip 124 and the alert module battery pack 136.

In application of the system 100, which will be hereinafter described, the receiver antenna 125 of the alert module 118 is adapted to receive the transmission signal 180 (FIG. 17) which is transmitted by the module antenna 108 (FIG. 15) of the motion detector 102. The receiver chip 124 activates the vibrator motor 128, which vibrates the alert module base 119 and the alert module cover 140 of the alert module 118. The vibrating alert module 118 alerts a user (not illustrated) to the motion which was detected by the motion detector 102.

As illustrated in FIG. 17, in exemplary application of the system 100, the motion detector 102 is attached to a tree 146 or other support. In some applications, the motion detector 102 may be attached to the tree 146 by attaching a motion detector strap 144 (illustrated in phantom) to the motion detector housing 103 and fastening the motion detector strap 144 around the tree 146. The motion detector strap 144 may be attached to the motion detector housing 103 by extending the motion detector strap 144 through strap openings 174 provided in the bottom housing panel 163 and/or the top housing panel 164 of the motion detector housing 102. As further illustrated in FIG. 17, the housing teeth 168 on the top housing panel 164 (and the housing teeth 169 on the bottom housing panel 163) may engage the tree 146 to stabilize the motion detector 102 at a selected height on the tree 146.

As further illustrated in FIG. 17, the position of each lens assembly 170 can be selected depending on the area which is to be monitored using the motion detector 102. Accordingly, the assembly mount arm 171 of each lens assembly 170 can be pivoted relative to the corresponding pivot pin 172 to adjust the position, orientation or aim of the sensor module 112 of each lens assembly 170. Moreover, the vertical aim of each sensor module 112 can be adjusted as desired by pivoting the lens housing 176 relative to the assembly mount arm 171 via the lens housing hinge 177.

The motion detector 102 may be turned on by manipulation of one or both of the power switches 114 (FIG. 15). The alert module 118 may be turned on by manipulation of the power switch 138 (FIG. 16) and is carried by a user (not illustrated). The user may carry the alert module 118 to a location which is beyond sight of the motion detector 102. In some embodiments, the alert module base 119 or the alert module cover 140 of the alert module 118 may be fitted with a clip (not illustrated), a belt loop (not illustrated) or other attachment mechanism to facilitate attachment of the alert module 118 to the belt or other article of clothing of a user. In some embodiments, the alert module 118 may be attached to a lanyard (not illustrated) which may be placed around the neck of the user. In the event that the sensor module 112 of one or both of the lens assemblies 170 of the motion detector 102 detects motion, the transmitter module antenna 108 (FIG. 15) transmits a transmission signal 180 which is received by the receiver antenna 125 (FIG. 16) of the alert module 118. The receiver chip 124 of the alert module 118 activates the vibrator motor 128, which vibrates the alert module base 119 and the alert module cover 140 of the alert module 118. Therefore, the user may return to the location of the motion detector 102 to investigate the source of the motion which activated the motion detector 102.

It will be appreciated by those skilled in the art that depending on the particular application of the system 100, the peripheral field of view of each sensor module 112 can be selectively narrowed or broadened by placement of the lens field adjustment plates 184 (FIG. 10) on the lens housing 176 or removal of the lens field adjustment plates 184 from the lens housing 176, respectively. Increasing the number of lens field adjustment plates 184 which are successively placed on the lens housing 176 in a stacked configuration progressively narrows the peripheral field of view of the sensor module 112. Conversely, decreasing the number of lens field adjustment plates 184 on the lens housing 176 progressively broadens the peripheral field of view of the sensor module 112. Complete removal or omission of the lens field adjustment plates 184 from the lens housing 176 maximizes the breadth of the peripheral field of view of the sensor module 112. Moreover, the multi-positioning capability of each lens assembly 170 facilitates aiming of the sensor modules 112 in any of a variety of directions to eliminate blind spots which may otherwise exist in operation of the system 101.

While various illustrative embodiments of the disclosure have been described above, it will be recognized and understood that various modifications can be made in the disclosure and the appended claims are intended to cover all such modifications which may fall within the spirit and scope of the embodiments of the disclosure.

What is claimed is:

1. A motion detecting and alerting system, comprising:

at least two motion detectors adapted to detect motion and transmit transmission signals upon detecting motion, each of the at least two motion detectors including:
a motion detector housing;
a motion detector transmitter module in the motion detector housing;
a module antenna interfacing with the motion detector transmitter module;
a light-sensing resistor interfacing with the motion detector transmitter module;
an LED interfacing with the light-sensing resistor;
a sensor module interfacing with the light-sensing resistor;
at least one lens assembly carried by the motion detector housing, the at least one lens assembly including an assembly mount arm carried by top housing panel of the motion detector housing, a lens housing carried by the assembly mount arm, a sensor module opening in the lens housing and a sensor module in the lens housing, the sensor module exposed through the sensor module opening and configured to sense motion through the sensor module opening; and
at least one alert module adapted to receive the transmission signals and indicate said motion, the at least one alert module including:
an alert module microprocessor;
at least two LED indicators interfacing with the alert module microprocessor, the at least two LED indicators corresponding in number to the at least two motion detectors, respectively; and
the alert module microprocessor configured to match corresponding frequency of the transmission signals emitted by each corresponding one of the at least two motion detectors with each corresponding one of the at least two LED indicators and responsively illuminate the corresponding one of the at least two LED indicators; and
a wrist strap carried by said at least one alert module.

2. The system of claim 1 further comprising a motion detector attachment mechanism carried by each of said at least two motion detectors.

3. The system of claim 2 wherein said motion detector attachment mechanism comprises an attachment strap.

4. A motion detecting and indicating method for detecting game, comprising:
placing at least two motion detectors in at least two monitored areas, wherein each of the at least two motion detectors comprises a motion detector transmitter module in motion detector housing, a module antenna interfacing with the motion detector transmitter module, a light-sensing resistor interfacing with the motion detector transmitter module, an LED interfacing with the light-sensing resistor and a sensor module interfacing with the light-sensing resistor; and wherein at least one alert module includes an alert module microprocessor; at least two LED indicators interfacing with the alert module microprocessor, the at least two LED indicators corresponding in number to the at least two motion detectors, respectively; and the alert module microprocessor configured to match corresponding frequency of transmission signals emitted by each corresponding one of the at least two motion detectors with each corresponding one of the at least two LED indicators and responsively illuminate the corresponding one of the at least two LED indicators;
attaching an alert module to a wrist of a monitoring person;
detecting encroachment of game into at least one of said monitored areas;
transmitting an activation signal from at least one of said motion detectors to said alert module; and
indicating said encroachment on said alert module.

5. The motion detecting and indicating method of claim 4 wherein said indicating said encroachment on said alert module comprises illuminating at least one indicator LED on said alert module.

6. The motion detecting and indicting method of claim 4 further comprising alerting said monitoring person to said encroachment.

7. The motion detecting and indicating method of claim 6 wherein said alerting said monitoring person to said encroachment comprises vibrating said alert module.

8. A motion detecting and alerting system, comprising:
at least two motion detectors adapted to detect motion and transmit transmission signals upon detecting motion, each of the at least two motion detectors including:
a motion detector housing having:
a front housing panel;
a pair of spaced-apart side housing panels;
a rear housing panel;
a bottom housing panel
a top housing panel; and
a plurality of serrated housing teeth in at least one of the top housing panel and the bottom housing panel;
at least one alert module adapted to receive the transmission signals and indicate said motion;
a wrist strap carried by said at least one alert module; and
wherein each of the at least two motion detectors comprises a motion detector transmitter module in the motion detector housing, a module antenna interfacing with the motion detector transmitter module, a light-sensing resistor interfacing with the motion detector transmitter module, an LED interfacing with the light-sensing resistor and a sensor module interfacing with the light-sensing resistor; and wherein the at least one alert module includes an alert module microprocessor; at least two LED indicators interfacing with the alert module microprocessor, the at least two LED indicators corresponding in number to the at least two motion detectors, respectively; and the alert module microprocessor configured to match corresponding frequency of the transmission signals emitted by each corresponding one of the at least two motion detectors with each corresponding one of the at least two LED indicators and responsively illuminate the corresponding one of the at least two LED indicators.

9. The system of claim 8 further comprising at least one lens assembly carried by the motion detector housing, the at least one lens assembly comprising an assembly mount arm carried by the top housing panel of the motion detector housing; a lens housing carried by the assembly mount arm; a sensor module opening in the lens housing; and a sensor module in the lens housing, the sensor module exposed through the sensor module opening and configured to sense motion through the sensor module opening.

10. The system of claim 9 wherein the at least two motion detectors each comprises a motion detector transmitter module in the motion detector housing, a module antenna interfacing with the motion detector transmitter module, a light-sensing resistor interfacing with the motion detector transmitter module and an LED interfacing with the light-sensing resistor, and wherein the sensor module interfaces with the light sensing resistor.

11. The system of claim 9 further comprising at least one lens field adjustment plate configured for detachable attachment to the lens housing, the at least one lens field adjustment plate having a plate opening configured for alignment with the sensor module opening in the lens housing, the at least one lens field adjustment plate configured to selectively partially obscure or restrict a peripheral field of view of the sensor module upon placement on the lens housing and widen the peripheral field of view of the sensor module upon removal from the lens housing.

12. The system of claim 11 wherein the at least one lens field adjustment plate comprises a circular plate rim, a plate tab extending from the plate rim and a plate magnet provided on the plate tab, and wherein the plate opening extends through the plate rim.

13. The system of claim 12 wherein the at least one lens field adjustment plate comprises a plurality of lens field adjustment plates.

14. The system of claim 9 wherein the lens housing is pivotally attached to the assembly mount arm.

15. The system of claim 9 wherein the at least one lens assembly comprises a pair of spaced-apart lens assemblies provided at opposite ends of the motion detector housing.

16. The system of claim 8 wherein the plurality of serrated housing teeth comprises a first plurality of serrated housing teeth in the top housing panel and a second plurality of serrated housing teeth in the bottom panel of the motion detector housing.

\* \* \* \* \*